(12) United States Patent
Harel

(10) Patent No.: US 12,021,837 B2
(45) Date of Patent: Jun. 25, 2024

(54) NETWORK ACCESS SYSTEM FOR DETECTING INTRUSIONS OVER A NETWORK

(71) Applicant: Darrien Ventures LLC, West Bloomfield, MI (US)

(72) Inventor: Ben Harel, West Bloomfield, MI (US)

(73) Assignee: Darrien Ventures LLC, West Bloomfield, MI (US)

( * ) Notice: Subject to any disclaimer, the term of this patent is extended or adjusted under 35 U.S.C. 154(b) by 0 days.

(21) Appl. No.: 17/062,767

(22) Filed: Oct. 5, 2020

(65) Prior Publication Data

US 2021/0092099 A1 Mar. 25, 2021

Related U.S. Application Data

(63) Continuation of application No. 16/579,962, filed on Sep. 24, 2019, now Pat. No. 10,834,053.

(51) Int. Cl.
*H04L 9/40* (2022.01)

(52) U.S. Cl.
CPC ...... *H04L 63/0272* (2013.01); *H04L 63/0263* (2013.01); *H04L 63/061* (2013.01); *H04L 63/20* (2013.01)

(58) Field of Classification Search
CPC ............ H04L 63/0272; H04L 63/0263; H04L 63/061; H04L 63/20; H04L 63/029; H04L 63/0823
See application file for complete search history.

(56) References Cited

U.S. PATENT DOCUMENTS

| | | | | |
|---|---|---|---|---|
| 7,447,333 | B1* | 11/2008 | Masticola | G16H 50/80 382/128 |
| 7,975,030 | B2* | 7/2011 | Saeed | H04L 63/0272 709/227 |
| 8,464,335 | B1* | 6/2013 | Sinha | G06F 21/51 713/153 |
| 10,375,024 | B2* | 8/2019 | Foxhoven | H04L 63/08 |
| 2006/0026682 | A1* | 2/2006 | Zakas | H04L 63/0218 726/22 |
| 2006/0143702 | A1* | 6/2006 | Hisada | H04L 12/4641 726/15 |
| 2006/0191005 | A1* | 8/2006 | Muhamed | H04W 88/08 726/15 |
| 2007/0157303 | A1* | 7/2007 | Pankratov | H04L 61/2575 726/11 |
| 2008/0022392 | A1* | 1/2008 | Karpati | H04L 63/20 726/15 |

(Continued)

OTHER PUBLICATIONS

AppGate SDP, AppGate SDP Admin Guide, Version: 4.3, Cryptzone North America, Inc., a Cyxtera business, 666 pages.

*Primary Examiner* — J. Brant Murphy
(74) *Attorney, Agent, or Firm* — Brooks Kushman P.C.

(57) ABSTRACT

A network access system for detecting intrusions over a network. The network access system includes a computer having non-transitory memory for storing machine instructions that are to be executed by the computer. The machine instructions when executed by the computer implement the following functions: receive network traffic from one or more discrete virtual private network connections, store the network traffic in a repository, and monitor the network traffic for a malicious action.

18 Claims, 7 Drawing Sheets

(56) References Cited

U.S. PATENT DOCUMENTS

| | | | |
|---|---|---|---|
| 2009/0235359 A1* | 9/2009 | Abdulhayoglu | H04L 63/0272 |
| | | | 726/25 |
| 2012/0023558 A1* | 1/2012 | Rafiq | H04L 63/08 |
| | | | 709/202 |
| 2012/0239790 A1* | 9/2012 | Doane | H04L 67/18 |
| | | | 709/220 |
| 2015/0135265 A1* | 5/2015 | Bagrin | H04L 63/02 |
| | | | 726/1 |
| 2015/0229646 A1* | 8/2015 | Ely | H04L 63/14 |
| | | | 726/1 |
| 2016/0241586 A1* | 8/2016 | Amoroso | H04L 63/0272 |
| 2016/0261564 A1* | 9/2016 | Foxhoven | H04L 63/0272 |
| 2016/0285831 A1* | 9/2016 | Doane | H04L 67/34 |
| 2017/0034189 A1* | 2/2017 | Powell | H04L 63/145 |
| 2017/0201385 A1* | 7/2017 | Kravitz | H04L 9/006 |
| 2018/0173549 A1* | 6/2018 | Browne | H04L 41/5009 |
| 2018/0191838 A1* | 7/2018 | Friedman | H04L 41/0895 |
| 2019/0208034 A1* | 7/2019 | Shribman | H04L 67/06 |
| 2020/0067700 A1* | 2/2020 | Bergeron | H04L 41/046 |
| 2020/0099719 A1* | 3/2020 | Rahkonen | H04L 63/20 |

* cited by examiner

| Destination | Gateway | Netmask | Flags | Metric | Ref | Use | Interface |
|---|---|---|---|---|---|---|---|
| default | 10.7.7.125 | 128.0.0.0 | UG | 0 | 0 | 0 | tun0 |
| default | 192.168.1.1 | 0.0.0.0 | UG | 0 | 0 | 0 | eth0 |
| 5.120.121.114 | 192.168.1.1 | 255.255.255.255 | UGH | 0 | 0 | 0 | eth0 |
| 10.7.7.1 | 10.7.7.125 | 255.255.255.255 | UGH | 0 | 0 | 0 | tun0 |
| 10.7.7.125 | * | 255.255.255.255 | UH | 0 | 0 | 0 | tun0 |
| 128.0.0.0 | 10.7.7.125 | 128.0.0.0 | UG | 0 | 0 | 0 | tun0 |
| 192.168.1.0 | * | 255.255.255.0 | U | 0 | 0 | 0 | eth0 |

FIG. 6

NETWORK ACCESS SYSTEM FOR DETECTING INTRUSIONS OVER A NETWORK

CROSS-REFERENCE TO RELATED APPLICATIONS

This application is a continuation of U.S. application Ser. No. 16/579,962 filed on Sep. 24, 2019, now U.S. Pat. No. 10,834,053 issued on Nov. 10, 2020. The entire disclosure of this application is hereby incorporated by reference.

TECHNICAL FIELD

This disclosure relates to a network access system for detecting intrusions over a network.

BACKGROUND

Virtual private networks (VPNs) provide logical isolation of private communications on public communications channels. VPNs secure these private communications and provide private remote access to designated network segments. Compromise of remote devices allows adversaries to access these designated network segments without authorization or permission.

SUMMARY

In one embodiment, a network access system for detecting intrusions over a network is disclosed. The network access system includes a computer having non-transitory memory for storing machine instructions that are to be executed by the computer. The machine instructions when executed by the computer implement the following functions: receive network traffic from one or more discrete virtual private network connections, store the network traffic in a repository, and monitor the network traffic for a malicious action.

In another embodiment, a network access system for detecting intrusions over a network is disclosed. The network access system includes a computer having non-transitory memory for storing machine instructions that are to be executed by the computer. The machine instructions when executed by the computer implement the following functions: receive network traffic from one or more discrete virtual private network connections between a client and a first server over the network, store the network traffic in a repository, and monitor the network traffic for a malicious action. The computer resides on a second server not on the network.

BRIEF DESCRIPTION OF THE DRAWINGS

FIG. 6 is a routing table for a computer system according to an embodiment.

DETAILED DESCRIPTION

Figure 1:
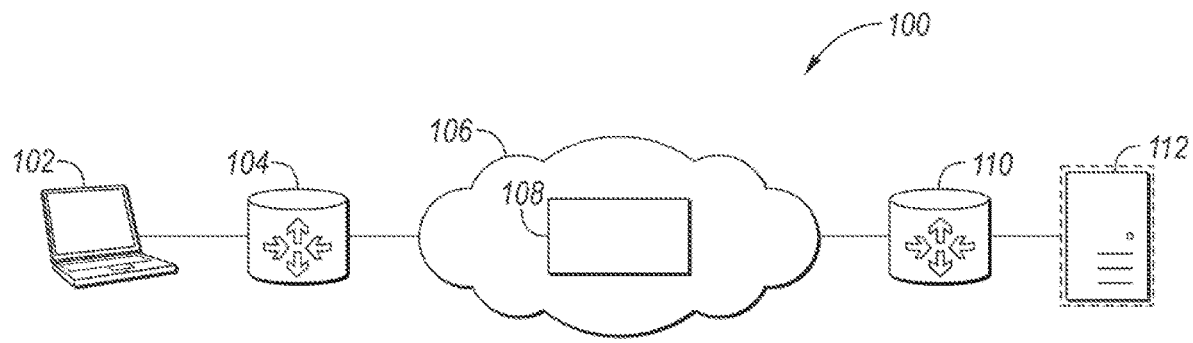
FIG. 1 is a schematic of an example cloud-based networking architecture.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

VPN appliances may be configured on the edge of a local area network segment or private network segment to control access to the local area network. For example, a remote client computer system may attempt access to server computer systems on the local area network. The remote client exchanges credentials with the VPN appliance before obtaining access to the local area network or private network. As such, the client obtains access to the server on the local area network. Portions of communications between the client and server may be encrypted and unencrypted. Traffic on public networks, wide area networks, cloud networks, and other systems may be encrypted by the client and the VPN appliance. Traffic on the local network or the private network may be unencrypted or sent in clear text. In certain instances, all network traffic between the client and server may be forwarded by the VPN appliance. Traffic on the wide area network may be encrypted by the client and the VPN appliance and traffic on the local area network may not be encrypted by the VPN appliance.

The unencrypted traffic on the local area network may be aggregated and mined for anomalies on a span port or other implement to detect intrusions on the local area network. The client may further gain access to other servers or server traffic on the local area network. This broad access to the local area network subnet by the client may allow an attacker to gain unauthorized access to other servers on the local area network.

A discrete VPN may be configured to create a VPN entirely between a client and a desired server. Traffic may be encrypted endpoint to endpoint. The discrete VPN may encrypt the entire communication path between the client and the server. Traffic exiting the clients network interface card may be encrypted, traffic traversing the wide area network may be encrypted, and traffic traversing the local area network may be encrypted using the same algorithm. Information sent from the client to the server may remain encrypted along the entire route from the client to the server. The encrypted packets may be transferred over the network from router to router without the encrypted information entrained therein from being exposed. Traffic between a client and server may be encrypted from point to point to ensure access to other servers on the local area network is prevented and confidential information is not disclosed.

Referring to FIG. 1, a network diagram 100 is shown. The network diagram 100 includes a client computer system 102, a router 104 associated with the client computer system 102. The client computer system 102 connects to a wide area network (WAN) or cloud 106 via the router 104 to a VPN broker 108 having access to the cloud 106 or as a portion of the cloud 106 has a publicly accessible IP address. The VPN broker 108 may be associated with a domain name system (DNS) to resolve IP addresses based on a domain name. For example, the client computer system 102 may access the VPN broker 108 through a uniform resource locator (URL) or web address. In similar fashion, a server 112 is associated with a router 110. The server 112 connects to the WAN or cloud 106 via the router 110 to the VPN broker 108 having access to the cloud 106 or as a portion of the cloud 106 has a publicly accessible IP address.

Figure 2:
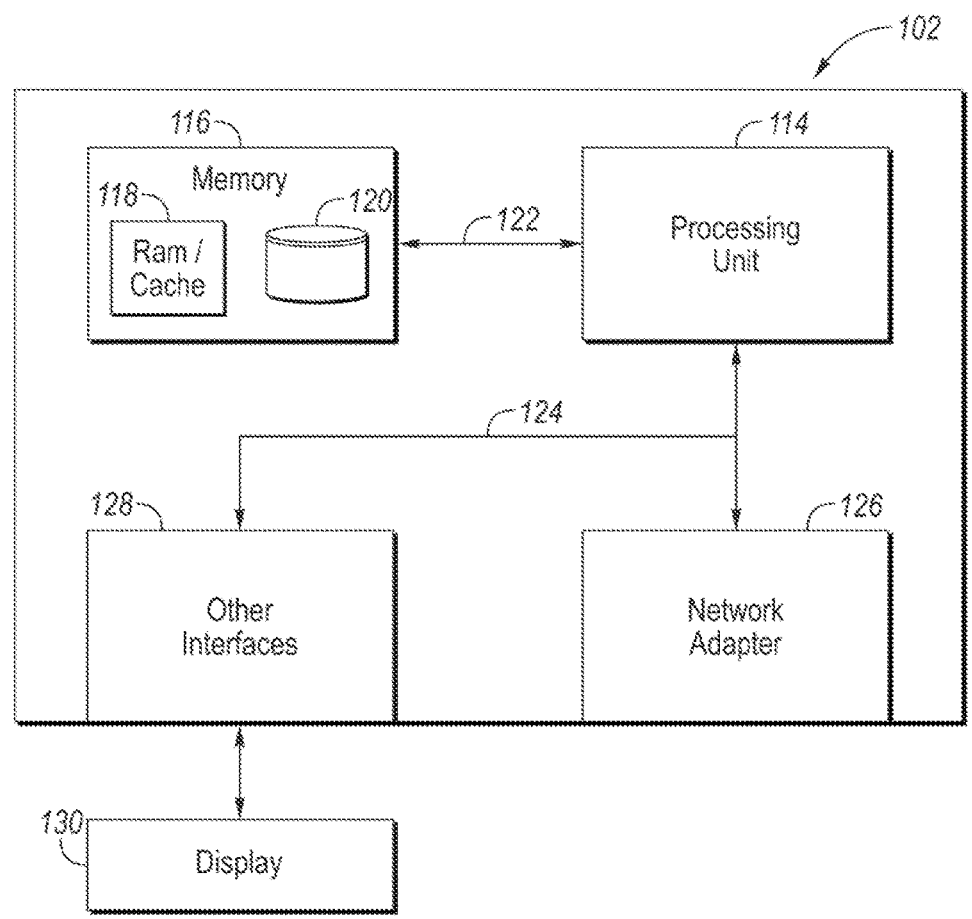
FIG. 2 is a schematic of an example computer system.

Referring to FIG. 2, an example client computer system 102 similar to that of the server 112 or VPN broker 108 is shown. The client computer system 102 includes at least one processing unit 114 that is configured to interact with memory 116 over memory bus 122. The memory 116 may include volatile random-access memory 118 or a cache. The memory 116 may further include non-volatile storage 120 such as hard drives or flash memory. The memory may store client programs or server programs in memory locations. The client programs and server programs may be stored in volatile random-access memory 118 or non-volatile memory 120 or both. The client programs and server programs may be loaded upon execution by the processor 114 from non-volatile memory 120 to the volatile memory 118.

The processing unit 114 is further configured to interface with a network adapter 126 (e.g., a network interface card) over communications bus 124. The network adapter 126 provides connectivity to overboard devices. Any communications protocols may be used by the network adapter 126 to communicate with the VPN broker 108 or the server 112. For example, the network adapter 126 may use Institute of Electrical and Electronics Engineers (IEEE) standard 802.3 or 802.11. The network adapter 126 may use any other protocol or communication method including 802.15.1 (BLUETOOTH), ZIGBEE, controller area network (CAN) protocols, universal asynchronous receiver-transmitter (UART). The network adapter 126 may interface with the processing unit 114 through kernel operations or application operations. The processing unit 114 may control operating system environments including application level and kernel level operations. The processing unit 114 may also interact with other interfaces 128 including display adapters. The display adapters may operate or send information to a display 130.

Figure 3:
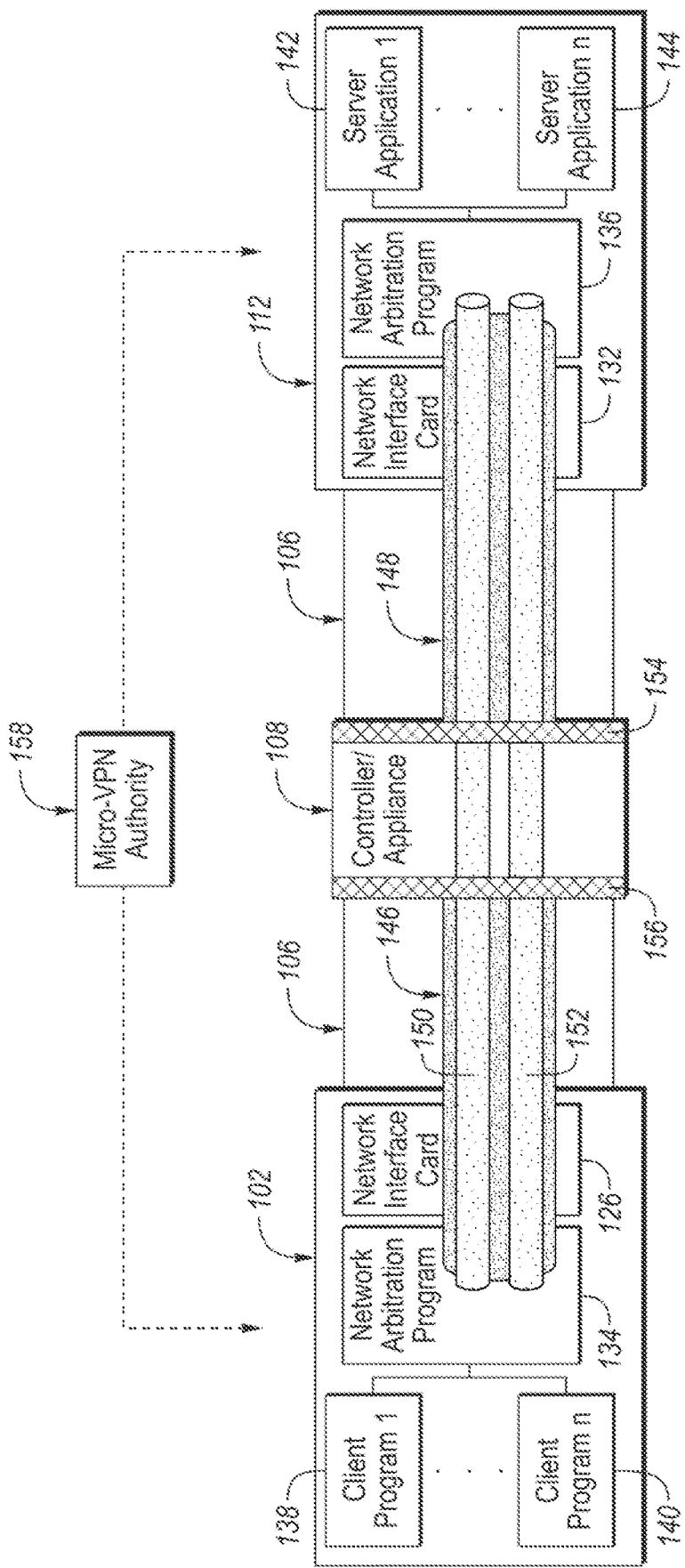
FIG. 3 is a schematic of a network connection between a client system and a server system through a network broker according to an embodiment.

Referring to FIG. 3, a network access system is shown. The client computer system 102 is connected with the broker 108 over a wide client VPN connection 146. The client computer system 102 may be unable to get the local IP address of the server 112 and initiate connections from the wide area network 106. As such, the VPN broker provides a secure location to maintain IP addresses for the local area network. The wide VPN connection 146 allows the client computer system 102 to obtain internal IP addresses associated with the server 112 from the VPN broker 108 or servers associated with the VPN broker 108. The VPN broker 108 may include mapped lists of local IP addresses and routes for all servers 112 configured for discrete VPN connections. The server network interface card 132 connects to the VPN broker 108 through the wide server VPN connection 148. The VPN broker 108 includes firewalls 156 and 154, each configured to dynamically open pinholes or ports to accommodate discrete VPN connections 150 and 152 between the client network arbitration program 134 and the server network arbitration program 136 after the wide VPNs 146 and 148 are established. The pinholes or ports are configured to generate dynamically based on routing information contained within VPN broker 108. VPN broker 108 acts as a router to open pinholes for the discrete VPN connections 150 and 152 that is isolated from any other discrete VPN.

After establishing the wide client VPN and wide server VPN, a first client program 138 initiates a request with the server 112 and the associated first server program 142. The request may be any communication protocol request. For example, the first client program 138 may initiate a get request from the IP address of the server 112. The request may be based on a different layer of the OSI or another model stack. For example, the request may be a transmission control protocol (TCP) request. That is, the request may be a SYN of a SYN-SYNACK-ACK cadence.

The request is recognized by the client network arbitration program 134 and the client network arbitration program 134 generates client data based on the first client program 138 that initiates the request. The client data may be derived by an algorithm that uniquely identifies the first client program 138. For example, the network arbitration program 134 or associated services may perform a hashing algorithm on the first client program 138 as it is stored in memory, operating in memory, on registers and stores used by the first client program 138, or any other data or operations related to the first client program 138. The algorithm may be configured to generate data for comparisons with certificates issued from a certificate authority or micro-VPN authority 158. Any type of authorization algorithm or comparator algorithm may be used to validate the first client program 138 with any combination of stored or received data available to network arbitration program 134.

In combination with self-validation by the client network arbitration program 134, the client network arbitration program is configured to receive server data from a server 112 having a corresponding first server program 142. The server data may be of any that uniquely identifies or identifies the first server program 142 to be used for the discrete VPN connection 150. In one or more embodiments, the server network arbitration program 136 prepares server data for validation by the client network arbitration program 134. The client network arbitration program 134 is configured to validate that client data against the server data to determine a valid combination of the client data and the server data. Any type of validation may be performed. For example, the client network arbitration program 134 may validate the server data by comparing the generated client data with a manifest to identify applicable first server programs. The client network arbitration program 134 may then compare the server data with enumerated server data within the manifest and associated with the client data. The manifest may be received at the client computer system 102 from the VPN authority. The manifest may include a lookup table of valid client data. The valid client data may be associated with an enumerated list of valid server data such that a comparison of the server data received is performed with respect to the enumerated server data. Any architecture or algorithm may be used to validate the client data against the server data such that valid combinations of client and server programs are identified. As such, valid combinations of client-server pairs allow the client network arbitration program 134 to establish the discrete VPN 150 with the server network arbitration program 136.

The client network arbitration program 134 ensures the client program 138 is authorized to make communications requests by verifying the client program 138 is valid. The client network arbitration program 134 establishes a discrete VPN 150 with the server network arbitration program 136 when the server program is valid. The discrete VPN 150 may include routing entries in both the client computer system 102 and server 112 routing tables. Other methods of implementing a VPN may be used.

Similarly, additional client programs 140 may establish connections to associated server programs 144. More than one client program 138, 140 may establish discrete VPN connections with one server program 144. One client program 138 may establish multiple discrete VPN connections with more than one server program 144. As shown, a second client program 140 establishes a second discrete VPN 152 with the server 112 to exchange data over the network 106. The second discrete VPN 152 has isolated information from the first discrete VPN 150. As such, the first client program 138 cannot access information received over the network 106 associated with the second client program 140 or access the second server program 144. The first client program 138 may establish an additional discrete VPN (not shown) through a similar validation process in order to enable network access with the second server program 144.

A micro-VPN authority 158 may distribute signed manifests to the client computer system 102 and server 112. The micro-VPN authority 158 may distribute signed credentials to the client computer system 102 and server 112 for establishing the wide VPNs 146, 148 and discrete VPN 248, 250 with the VPN broker 108. That is, only client computer system 102 and server 112 having the signed credentials, certs, or combinations thereof may be allowed access to the VPN broker 108.

Figure 4:
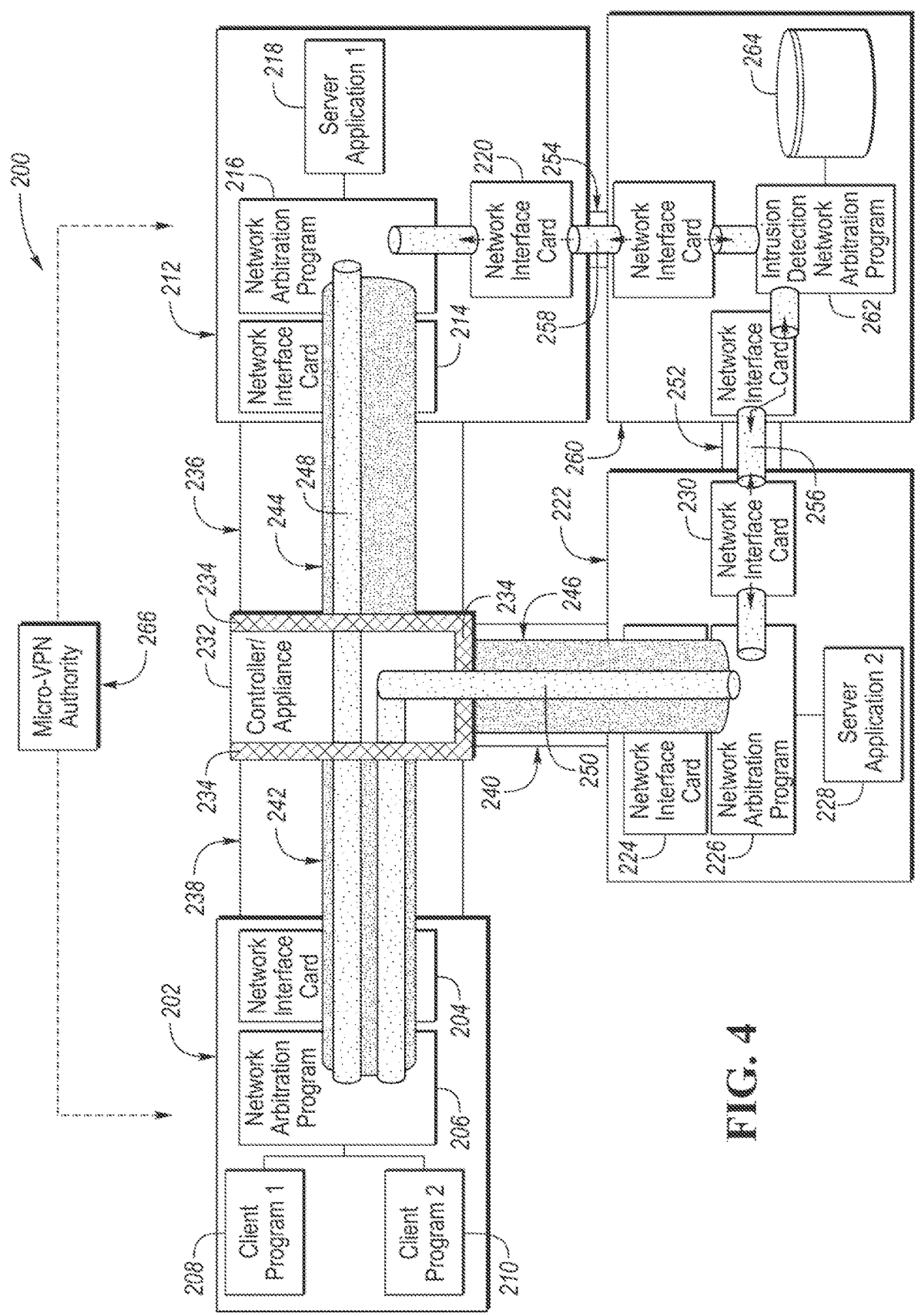
FIG. 4 is schematic of a network connection between a client system and a first server system and a second server system through a network broker according to an embodiment.

As shown in FIG. 4, a networked communications system 200 is shown. The client 202 may access multiple distributed hardware systems or servers 212, 222. The servers 212, 222 may be located proximate one another or distributed throughout the world. Servers 212, 222 may be located conveniently and the confidentiality of information included in discrete VPN connections 248, 250 is maintained. All network traffic across discrete VPN connection 248, 250 may be aggregated by a third network aggregation server 260 that may be aggregated similarly with servers 212, 222 or located at a third distinct location. WAN connections 236, 238, 240, 252 and 254 may be any number of network interfaces and interconnects.

As presented, the client 202 has a client network arbitration program 206 operable to establish a wide VPN connection 242 with the network broker 232. Such communications may be subject to valid credentials supplied by the micro-VPN authority 266. The micro-VPN authority 266 may be a server or supplier available over a network or air-gapped network to the client 202. The client network arbitration program 206 may be operable to establish a discrete a VPN connection 248 with a first server network arbitration program 216 over network interface cards 204 and 214, providing first client program 208 with access to first server application 218. The client network arbitration program 206 may be operable to establish a discrete VPN connection 250 with the second server network arbitration program 226 over network access cards 224 and 204, providing second client program 210 with access to the second server application 228. Discrete VPN 248, 250 are established after VPN broker 108 firewall 234 is configured to dynamically opens a pinhole or port for the discrete VPN connections between the client network arbitration program 206 and the server network arbitration programs 216 and 226.

The network aggregation server 260 may be configured to monitor and protect server network arbitration programs from malicious action by any client 202 connected over discrete VPN connections 248 and 250. Typical span monitoring of internal network traffic is monitored on span ports is available to the internal network. With the encryption of local network traffic up to the network arbitration programs 206, 216 and 226 network monitoring is unavailable. The network aggregation server 260 may be local, irrespective of whether the network aggregation server 260 is on the same network as the client 202 or servers 212, 222. Similarly, the network aggregation server 260 may connect to the network broker 232 or if on the same local network as either the first server 212 or the second server 222, the network aggregation server 260 may gain duplicate access to the discrete VPN paths 248, 250 by connecting to the servers network arbitration programs 216, 226 through discrete VPN paths 256, 258 using network interface 230 and 220. As mentioned network connections 252, 254 may be WAN connections or LAN connections. WAN connections being made through the network broker 232, similar to wide VPNs 242, 244 and 246.

The intrusion detection or prevention arbitration program 262, server network arbitration programs, and any other arbitration program may be operable to generate client data derived at least in part by an algorithm that uniquely identifies the client program. The client program for arbitration program 262 being the aggregation program that copies all network traffic from the discrete VPNs and stores the data in repository 264. The repository 264 may be any type of datastore or database configured house network traffic data. The server network arbitration programs 216, 226 are configured to copy network traffic received and transmitted via the discrete VPNs 248, 250 to the intrusion detection arbitration program 262. The intrusion detection arbitration program 262 receives such information and stores it in repository 264.

Figure 5:
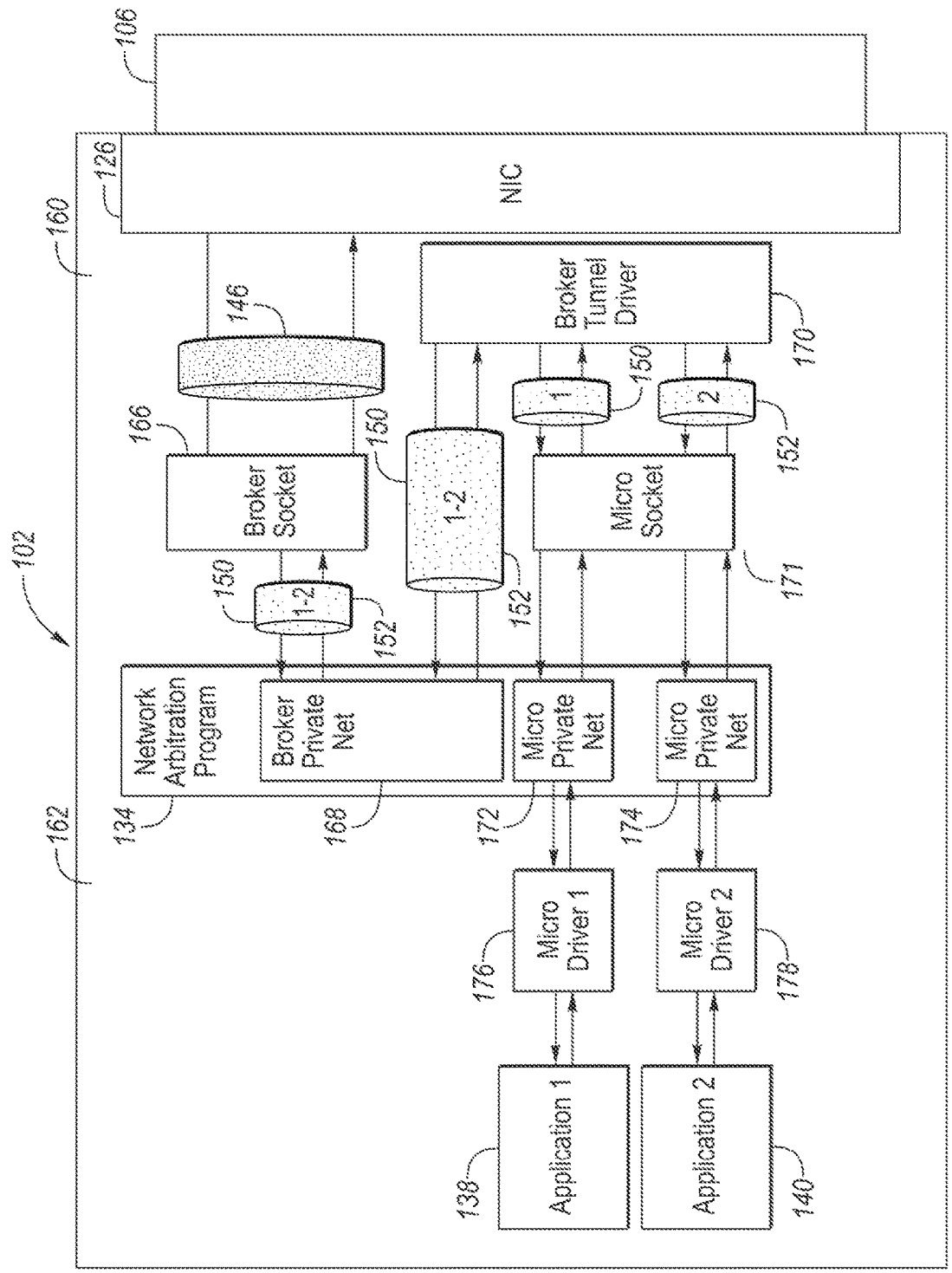
FIG. 5 is a kernel-level schematic of a network arbitration program according to an embodiment.

Referring to FIG. 5, a data exchange between application layer 162 and kernel 160 of client computer system 102 or any client or server systems 112, 202, 212, 222 and 260 discussed herein. A network connection 106 as shown in FIG. 3 but also shown in FIG. 4 is depicted. The network connection 106 is physically terminated at network interface card 126. The network interface card 126 transfers the wide VPN 146 to the broker socket 166. The wide VPN 146 may be decrypted and available to the network arbitration program 134. The network arbitration program 134 is configured to receive the discrete VPNs 150, 152 and may communicate with the broker through the broker VPN 168 on the application layer. The broker private network program 168 decrypts the incoming wide VPN 146 communications and sends them to the broker tunnel driver 170. The broker tunnel driver 170 communicates with discrete VPN socket 171 to communicate with respective discrete VPN encryption program 172, 174 corresponding to the discrete VPNs 150, 152. The discrete VPN encryption programs 172, 174 may encrypt information only available to the memory registers assigned to client or server applications 138, 140. That is, discrete drivers 176, 178 isolate application data such that read access to memory registers associated with other applications is not allowed.

Referring to FIG. 6, a routing table 300 is shown. The routing table 300 includes destination address 302 including preferred gateways 304 associated with outgoing IP destination addresses 302. A netmask 306 defines the subnet associated with the destination IP address 302. The flags 308, metric 310, ref 312 and use 314 relate to use, priority, uplink status, and other routing information. The interface used to access the destination address 302 is specified in the Interface column 316. A wide VPN 242 or discrete VPN 248 may be implemented as a routing table entry. Traffic among clients 102 and servers 112, among others, is routed to VPN addresses established through a VPN initiation.

Figure 7A:
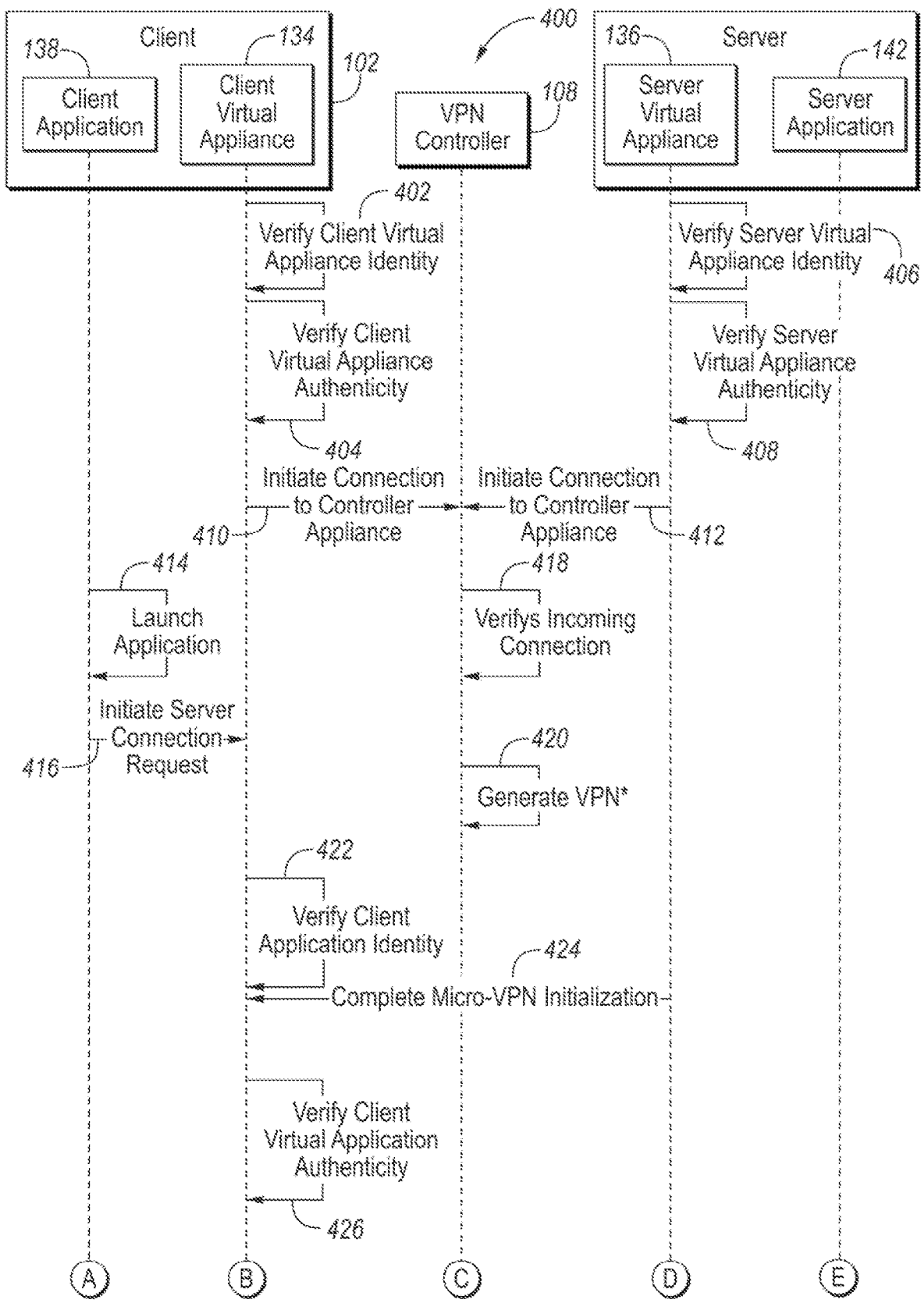
FIGS. 7a and 7b depict a method of generating a discrete virtual private network according to an embodiment.
Figure 7B:
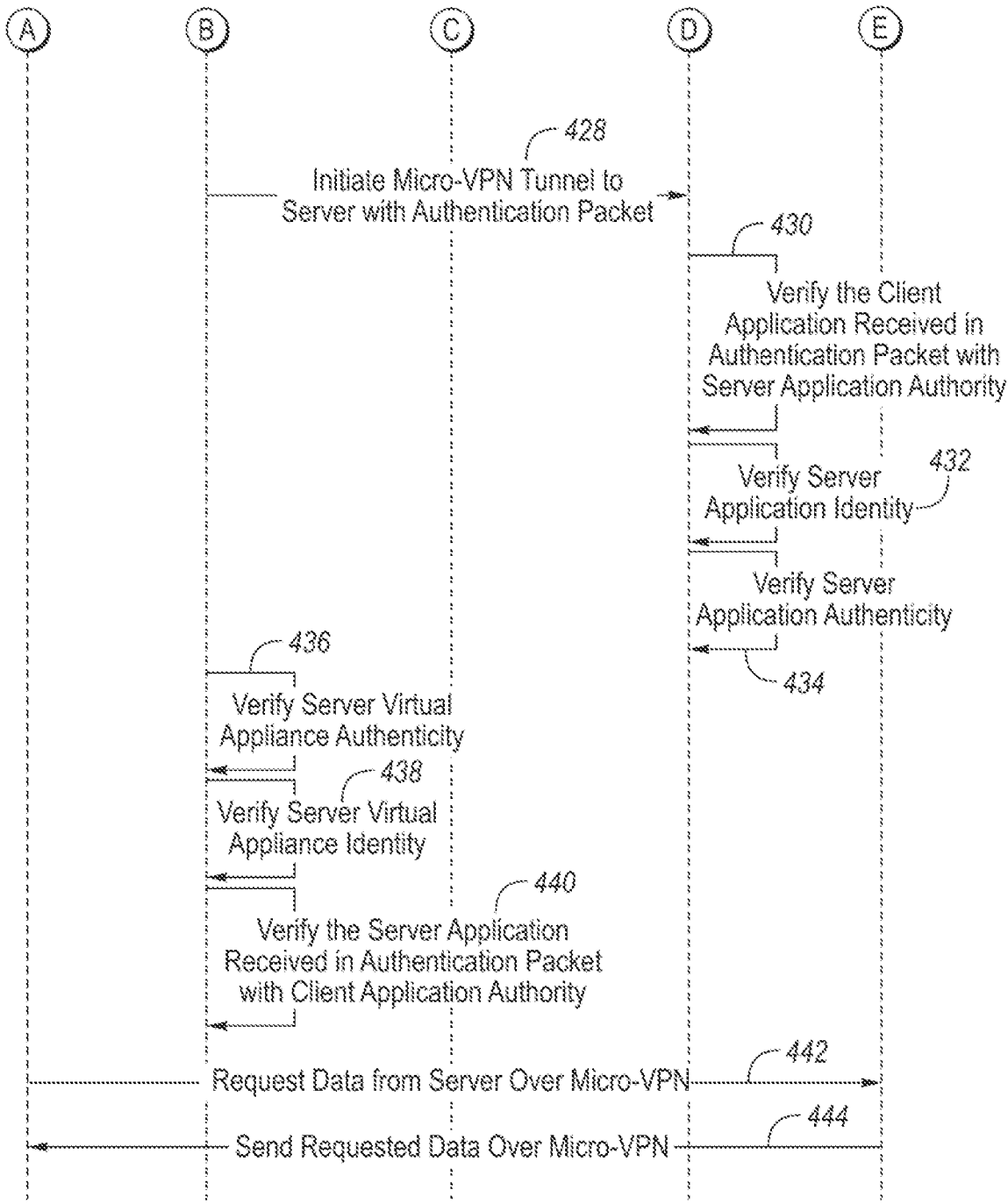

Referring to FIGS. 7a and 7b, a method 400 is shown. Although shown as being performed by particular apparatuses, any and all of the apparatuses or combinations thereof may perform and any or all of the steps discussed throughout this disclosure or combinations thereof. Any or all of the steps may be omitted, rearranged, or duplicated. Although reference to one embodiment or another may be made, any of the embodiments include or perform any of the steps mentioned. In steps 402 and 404, the client arbitration program 134 may check itself for authenticity and identity. The client network arbitration program 134 may self-check authenticity and identity by checking the hash against the table, manifest, or list of acceptable client network arbitration programs 134. The check may be performed by any method, including hash-based or certificate-based checks. Similarly, the VPN broker 108 and the server network arbitration program 136 may perform self-checks of the stored or running programs, instructions, or logic for authenticity and identity.

In steps 410, 412, the client network arbitration program 134 and the server network arbitration program 136 initialize a wide VPN 146 and 148 with the VPN broker 108. Any private network or virtual private network protocol may be used. For example, IPSEC or SSL may be used to create a secure connection. the client network arbitration program 134 and the server network arbitration program 136 may use pre-exchanged keys or generate keys to establish secure communications with the VPN broker 108. The VPN broker 108 may validate the client network arbitration program 134 and the server network arbitration program 136 through similar methods in step 418 before stablishing the wide VPN in step 420 with the client network arbitration program 134 and the server network arbitration program 136.

In step 414, the client computer system 102 initializes the first client program 138. The client program 138 and client network arbitration program 134 establish a secure communications channel or memory segment. In step 416, the client program sends a network communications request with the server 112. The client network arbitration program 134 may intercept such communications requests or recognize such requests and verify the client program 138 in step 422.

In step 424, the server network arbitration program 136 sends an initialization packet with server data from the first server program 142. The server data may be any type of identifying information. As one example, the server data may be hash associated with the server program 142. In step 426, the client network arbitration program 134 checks the server against a list or manifest of acceptable server data. The client network arbitration program 134 may check a one-for-one or signature match with the client data associated and generated from the client program 138. After validation, the client network arbitration program 134 initiates a discrete virtual private network connection for the client program 138 associated with the server program 142 with the server network arbitration program 136, in step 428.

In step 430, the server network arbitration program 136 verifies the client data. The client data may include a hash, certificate or other information uniquely identifying the client program 138. The client data may also uniquely identify the client network arbitration program 134. In step 432, the server network arbitration program 136 validates the server application 142 identity, and in step 434, the server network arbitration program 136 validates the server application 142 authenticity. In step 436, the client network arbitration program 134 checks the server program 142 identity. In step 438 the client network arbitration program 134 checks the server program 142 authenticity. Based on the server application 142 received authentication packet data the client network arbitration program 134 checks the data and configures a first discrete VPN 150. The first discrete VPN 150 may be configured with any type of VPN connections including IPSEC and SSL. Any type of handshake or configuration may be performed.

In step 442, the client program 138 requests data from server program 142. In step 444 the server program 142 provides the request information to the client program 138. It should be appreciated that any number of discrete VPNs may be created or initialized and validated using similar processes for one or more applications or application pairs.

It should be appreciated that any type of VPN connection may be used to ensure information confidentiality and integrity. For example, an SSL VPN may be used. As another example, and IPSEC VPN may be used. Any type of handshake or key exchange may be used. Any type of encryption algorithm may be used. The keys may be pre-shared.

Any network arbitration program may be operable upon execution by a computer to generate client data derived at least in part by an algorithm that uniquely identifies the client program receive server data from the server program over the network, validate the client data against the server data to determine a valid combination of client data and server data, and configure an individual virtual private connection for the client program and the server program in response to the determination of the valid combination. Client and server nomenclatures may be interchanged and reversed. The terms client and server are not limiting and may only indicate a first hardware or software and a second hardware or software.

The network arbitration program may configure a discrete virtual private network connection with a routing table entry associated with a program such that data associated with the first program and the second program traverse the route. Data associated with other applications is routed via a split tunnel isolated from the routing table entry. That is, the other data from other applications may connect directly to the internet without traversing a virtual private network. The network arbitration program may be configured to filter communications from one of the programs or a subcomponent thereof and route the communications through the discrete virtual private network. Such interception may be performed at the kernel level or through sockets. The interception may be performed through network adapters or drivers. Communications filtering may be performed by comparing process identifiers of one of the programs.

The discrete communications may be routed through an arbitrary route entry. The discrete communications may be routed through a random route entry. For example, the routing information identified in the routing table may only be known to the network arbitration program. The network arbitration program may generate the arbitrary or random entry. The network arbitration program may be operable to compare an attempt to interact with a program with a list of approved interactions, and responsive to the attempt being unapproved, terminate the discrete virtual private network connection. For example, calls, pushes, writes, reads, or other interactions may be unavailable to client or server applications. Such requests will deny access to or close the discrete VPN. The network arbitration program may be disposed computer memory. The computer memory may be volatile memory. The computer memory may be non-volatile memory.

The server data may uniquely identify a server network arbitration program and the network arbitration program is operable to configure the discrete virtual private network connection upon validation of the server network arbitration program. Such validation may include a secret approval of a configuration phase of the discrete virtual private network connection configuration. The secret may be cryptographic representation of the client program. The secret maybe cryptographic representation of the server program. The phase of the discrete virtual private network connection configuration may be a first phase of an IPSEC key exchange. The validation may include authentication of the client data and server data. The authentication may be based on a comparison between client data and a manifest including the client data and server data. The manifest or list may be stored on the computer and received from an application authority server. The manifest may be stored as a blockchain of manifests received from the application authority server. As such, a comparison of entries in the blockchain may indicate tampering of the application authority server or manifest, thus denying access to the discrete VPN or the wide VPN.

The network arbitration program may be operable to configure a plurality of general virtual private network connections between the computer and a network broker before configuration of the discrete virtual private network connection. The network arbitration program may be configured to establish one of a plurality of general virtual private networks with preshared data associated with the network broker, such as a password, a cryptographic key or certificate. The preshared data may be a certificate issued by the network broker. The network arbitration program may issue network port access for the client program when the client program attempts to communicate with the server program.

The network arbitration program may be configured to establish the individual private network responsive to the public virtual private network connection between the computer and a network broker being established. The network arbitration program may be operable to establish a connection with a network broker. The network arbitration program may be operable to receive a server network location from the connection. The network arbitration program may be configured as a network bridge between a physical network interface and the client program. The network arbitration program may be a virtual network adapter configured to identify network data received via the discrete virtual private network connection for use by the client program. The network bridge may be configured to forward frames having a destination associated with the client program. The network arbitration program is configured to provide data in frames associated with the client program to the client program. The identification of network traffic may be by copying the data to a specific memory location. The client data may be a certificate associated with the client program. One of the algorithms may include a hash function. The algorithm may be deterministic and has output that is significantly unique to uniquely identify the client program.

The network broker may be disposed as an intermediary between the client and the server. The client and the server may exchange host information or connection information with the network broker. The network broker may establish wide virtual private networks with the client network arbitration program and the server network arbitration program. The network broker may provide host information to the client network arbitration program and the server arbitration program.

As an example, the network arbitration program may perform hashes on the respective program at computer startup or at the initialization of the network arbitration program. The network arbitration program may have subprocesses to constantly perform hash programs. The algorithm used by the client arbitration program and the server network arbitration program may be the same. They may also be different in that the external system may have a more complicated unique identification protocol than the local system. For example, the server network arbitration program may only identify applications based on certificate, while the client network arbitration program may identify applications by hash. The client, the server, and the server may include actual hardware or be implemented virtually.

In an example, the client computer system 102, or servers 112, or one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Python, Java Script, Perl, PL/SQL, etc. Further, the processors, components, and computers may be further enabled to implement any communications protocol, operation, request for comment (RFC), Institute of Electrical and Electronics Engineers (IEEE) standard, or any other group or society standard. Logic and control may be performed by any number of processors, processing systems, application-specific integrated circuits (ASICS), logic trees, or combination thereof.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed:
1. A network access system for detecting intrusions over a network, comprising:

a computer having non-transitory memory for storing machine instructions that are to be executed by the computer, the machine instructions when executed by the computer implement the following functions:
- receive network traffic from two or more discrete virtual private network connections;
- copy all the network traffic from the two or more discrete virtual private network connections to obtain copied network traffic;
- aggregate the copied network traffic to obtain aggregated network traffic;
- store the aggregated network traffic in a repository on the computer; and
- monitor the network traffic for a malicious action.

2. The network access system of claim 1, wherein the computer is a local computer.

3. The network access system of claim 1, wherein the machine instructions when executed by the computer implement the following functions: receive the network traffic from the two or more discrete virtual private network connections through two or more network interfaces.

4. The network access system of claim 3, wherein each of the two or more network interfaces is configured to be connected to a network connection.

5. The network access system of claim 4, wherein the network connection is a WAN connection or a LAN connection.

6. The network access system of claim 3, wherein each of the two or more network interfaces are two or more network interface cards.

7. The network access system of claim 1, wherein the repository is a datastore or a database.

8. The network access system of claim 1, wherein each of the two or more discrete virtual private network connections is connected to two or more client computers.

9. The network access system of claim 1, wherein the two or more discrete virtual private network connections include first and second discrete virtual private network connections.

10. A network access system for detecting intrusions over a network, comprising:
a computer having non-transitory memory for storing machine instructions that are to be executed by the computer, the machine instructions when executed by the computer implement the following functions:
- receive network traffic from two or more discrete virtual private network connections between one or more client and server computers over the network, the computer residing on a second server not on the network;
- copy all the network traffic from the two or more discrete virtual private network connections to obtain copied network traffic;
- aggregate the network traffic from the two or more discrete virtual private network connections to obtain aggregated network traffic;
- store the aggregated network traffic and the copied network traffic in a repository on the computer; and
- monitor the network traffic for a malicious action.

11. The network access system of claim 10, wherein the computer is a local computer.

12. The network access system of claim 10, wherein the machine instructions when executed by the computer implement the following functions: receive the network traffic from the two or more discrete virtual private network connections through two or more network interfaces.

13. The network access system of claim 12, wherein each of the two or more network interfaces is configured to be connected to a network connection.

14. The network access system of claim 13, wherein the network connection is a WAN connection or a LAN connection.

15. The network access system of claim 12, wherein each of the two or more network interfaces are two or more network interface cards.

16. The network access system of claim 10, wherein the repository is a datastore or a database.

17. The network access system of claim 10, wherein each of the two or more discrete virtual private network connections is connected to one or more client computers.

18. The network access system of claim 10, wherein the two or more discrete virtual private network connections include first and second discrete virtual private network connections.

* * * * *